United States Patent [19]

Bates

[11] 4,280,150
[45] Jul. 21, 1981

[54] HELICAL SCAN VIDEO TAPE RECORDER GUARD BAND INTERFERENCE DETECTOR FOR GENERATING CONTROL PULSES AT LOW TAPE SPEEDS

[75] Inventor: George W. Bates, Santa Ana, Calif.

[73] Assignee: Convergence Corporation, Irvine, Calif.

[21] Appl. No.: 87,204

[22] Filed: Oct. 22, 1979

[51] Int. Cl.³ .................. G11B 27/02; G11B 15/48; G11B 21/10; H04N 5/78
[52] U.S. Cl. .................................. 360/14; 360/74.4; 360/77; 360/11
[58] Field of Search .................. 360/10, 11, 14, 36, 360/38, 73, 74.4, 76, 77

[56] References Cited

U.S. PATENT DOCUMENTS 3,662,101 5/1972 Segerstrom .................. 360/11 X

Primary Examiner—Bernard Konick
Attorney, Agent, or Firm—Keith D. Beecher

[57] ABSTRACT

A detection system is provided in a helical scan video tape recorder to detect guard band interference signals at low video tape speeds and for generating control pulses in response thereto which may be used by editing control systems, and the like, for counting frames on the video tape, and for indicating the direction of tape motion at such low tape speeds to enable the editing control system to control the operation of the video tape recorder in the vicinity of a selected edit frame in order that appropriate editing of the video tape may be achieved.

4 Claims, 6 Drawing Figures

TAPE PATTERN

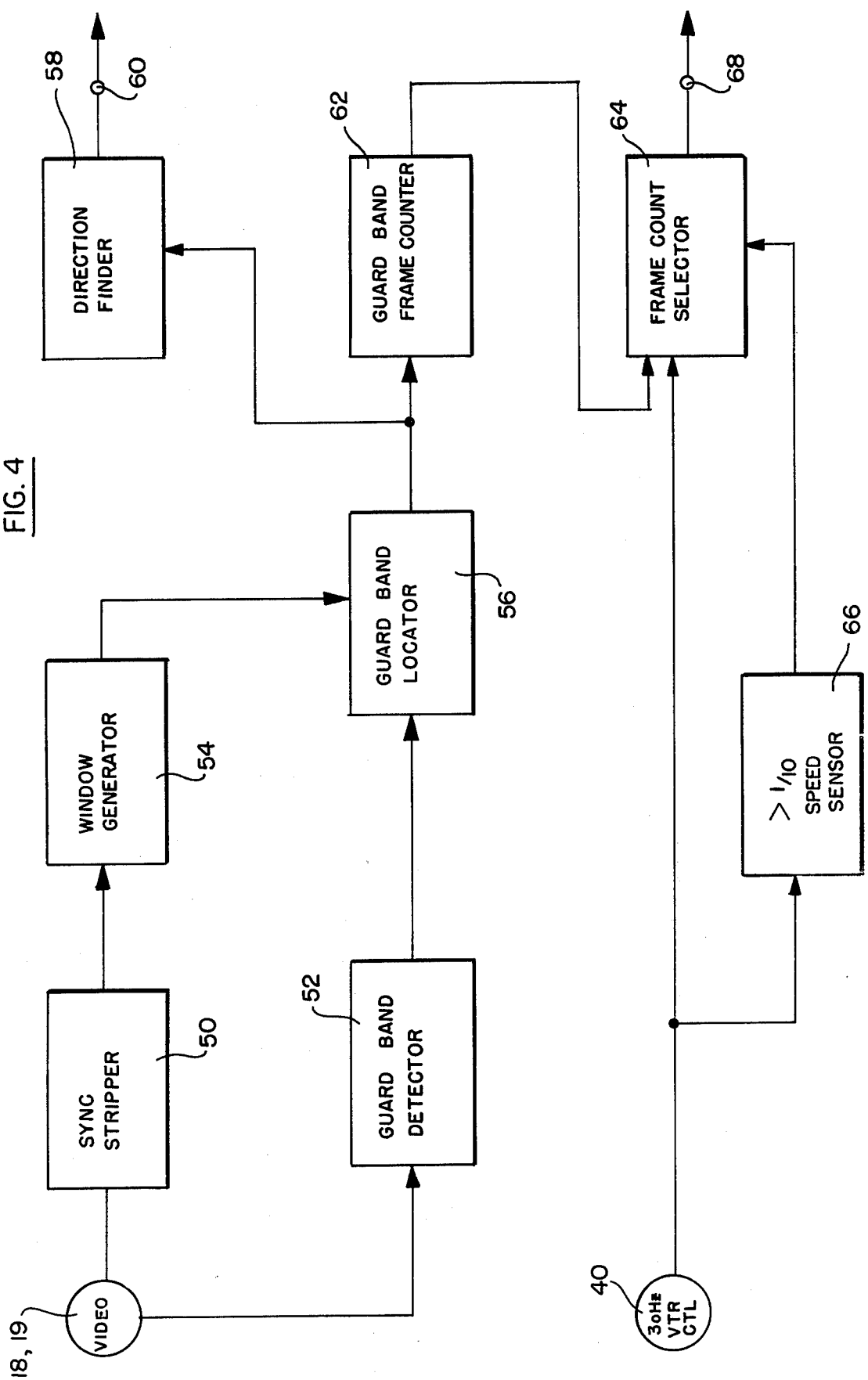

HELICAL SCAN VIDEO TAPE RECORDER GUARD BAND INTERFERENCE DETECTOR FOR GENERATING CONTROL PULSES AT LOW TAPE SPEEDS

BACKGROUND

U.S. Pat. No. 4,040,098, which issued Aug. 2, 1977 to Gary H. Beeson et al, and which is assigned to the present assignee, discloses a video tape editing control system which has particular utility in conjunction with cassette-type helical scan video tape recorders. The video tape in such a video tape recorder is provided with a control track in which magnetic pulses are recorded, one for each frame of video information on the tape. The editing control system described in the patent utilizes the control pulses from the control track of the tape to control the operation of the video tape recorder during the editing procedures, thereby obviating the need for utilizing the complex time codes recorded on the tape and the complicated ancillary equipment which responds to such codes.

The magnetic pulses recorded on the control track of the video tape are detected in the video tape recorder by a magnetic head which produces electrical pulses corresponding to the recorded magnetic pulses, as the video tape is drawn across the magnetic head. The signal level of the electrical pulses from the magnetic head is dependent upon and proportional to the speed at which the video tape is drawn across the head. As the tape is slowed, for example, to below one-half normal play speed, the signal level of the pulses produced by the head decreases rapidly and soon becomes too low to be utilized reliably, and at very low speeds the pulses disappear completely. Therefore, as explained above, the control track on the video tape is ineffective for supplying control pulses to the editing control system at low speeds of the tape, and at a point in the editing process when precise indications of the tape field and of the tape direction are required. The guard band detection system of the invention was conceived to provide a means for enabling the editing control system to determine tape frame positions and tape direction at such low speeds.

In the helical scan video tape recorder the video signals are recorded on the video tape by a pair of video record/playback heads. The heads are mounted on a scanner which moves the heads across the tape even when the tape is stationary, so that the signal output level of the heads is maintained independent of tape speed. The video information recorded on the video tape by these heads takes the form of parallel tracks which extend diagonally across a center portion of the tape. Each diagonal track represents one field of video information, and each pair of the video tracks represents one frame of video information. The individual diagonal video tracks are separated from one another by a diagonal space which bears no recording and which is known as a guard band.

So long as the video tape is being moved at normal play speed during a playback operation, the video record/playback heads are controlled so that each head scans exactly along a previously recorded diagonal video track and does not enter the adjacent guard band. However, when the tape is stopped, or is moving at a slow speed, the video record/playback heads move into the adjacent guard band during each scanning cycle, and thereby create guard band interference in the reproduced video signal. This interference takes the form of a signal burst which occurs in each video field, and these signal bursts are detected by the system of the present invention and are used to provide control pulses when the video tape is moving at slow speeds, and which replace the usual control track pulses which are no longer available for frame counting purposes.

In addition to losing the control track pulses at slow tape speeds, there is the problem of sensing the direction of movement of the tape during such slow speeds, and particularly when the tape is being slowed down to a stop, or started up from a stop. In either situation the control track pulses are lost and the logic circuitry of the editing control system has no way of determining tape direction. The control pulses derived from the guard band interference by the system of the invention are also used to provide an indication of tape direction.

During the recording operation of the video tape recorder, the video information is recorded by each record/playback head at normal speed of the tape, which is 3¾ inches per second in most cases for the ¾ inch cassette video tape recorders. At normal speed the tape is moving very slowly but the record/playback heads which are located on the scanner rapidly move at a high speed relative to the tape to provide a bandwidth sufficient to record the video signal, sufficient tape being available in each diagonal track to record one full video field of information.

Since two video fields are interlaced to provide one frame of video information, the two fields are recorded in sequence, one by each of the two video record/playback heads as the tape moves across the face of the scanner in the video tape recorder. The helical tracking of the heads on the tape is obtained by having the heads rotate in a plane which is at a slight angle to the direction of tape motion. Thus, a recording length of about seven inches is achieved for each field of video information, on a tape which is actually only ¾ of an inch wide. Not only is the tape only ¾ of an inch wide, but only a central portion of the tape is used, because there are two audio tracks along one edge of the tape and a control track along the other edge.

The separation of the tracks of video information after the video signal has been recorded on the tape, as noted above, is called the guard band. This separation is created because the tape is moving as each of the two record/playback heads are scanned across the tape. Therefore, as one head leaves the tape from one edge, after finishing its recording of its field, the other head enters the tape from the other edge to begin recording the next field. Since the tape has moved from the position that it was in when the recording of the previous field as initiated, the second field is recorded along a second diagonal track separated from the previous track by the guard band.

Since the video information is recorded at a specific speed, it follows that when the tape is moving at any speed other than the specific speed during the playback operation of the video tape record, when the video information is being read from the tape, the effective angle of scanning of the record/playback heads changes. When the video tape recorder is playing back the video information on the tape during normal play speed of the tape, the electronics of the video tape recorder synchronizes the position of the heads as they enter the tape so that the diagonal tracks representing the fields recorded on the tape will line up precisely with the entry of the heads into the scanning area.

However, if the tape slowed to below normal play speed, the scanner will continue to turn at a constant speed, but the distance the tape moves between successive scans becomes less and less. This results in an effective angle change of the scanning process. As the scanning angle changes, the heads will no longer follow the recorded tracks precisely. For example, if by chance one of the record/playback heads enters the scanning area of the tape accurately centered on a track during a playback operation at less than playback speed, then, since the head is travelling at a different effective angle than was travelled when the field of video information was recorded, it will be precisely centered on that track only for a short distance and it will gradually move off the track and into the guard band between the track and the adjacent track.

The distance the head moves off the center line of the track, will vary with the speed of the tape. The zero variation, of course, being when the tape is running at play speed, and the maximum variation being when the tape is running in the reverse direction at play speed. Thus, at play speed the head and the track are in perfect alignment, and as tape speed becomes slower and slower, the variation becomes more and more pronounced. At zero tape speed, the head will move across the guard band area and will enter the adjacent track.

When the digression of either one of the record/playback heads into the guard band from a first track begins, there will be no apparent degradation of the signal as long as the trailing side of the head is still on the first track and the leading side of the head is still in the guard band area. But as soon as the leading edge of the head begins to impinge upon the adjacent track, the head will begin to pick up composite video signals from that track as well as composite video signals from the first track, and this creates a disturbance in the output signal of the head which will be referred to herein as guard band interference signals. The amplitude of the guard band interference signals increase as the head progresses until a point is reached where equal video information from the two adjacent tracks is being read by the head. As the head continues to move away from the first track and toward the adjacent track, the interference then drops off until the head is no longer reading the original track, but is reading video information solely from the adjacent track.

The guard band interference signals can be observed on an oscilloscope, and they are represented by an extreme amplitude change and a large amount of interference and noise in the composite video signal. The guard band interference signals also can be observed on a television monitor as a band of distorted video information. The band observed on the television monitor is relatively narrow, typically 10-20% of the height of the frame as displayed on the monitor. Therefore the entire picture is not lost.

Probably, the easiest way to begin to understand how the guard band interference signals may be used for counting tape frames and for designating tape direction at low tape speeds is by considering the tape in a stopped condition. If the tape is stopped, and a particular record/playback head happens to enter the video recording area precisely centered upon one track of video recording, it will exit the area precisely centered on the adjacent track. This causes the distorted band to appear on the television monitor midway in the field interval, or half-way between the top and bottom of the monitor screen. Any motion of the tape in either direction, will cause the band to move either up or down the screen. If, on the other hand, a particular record/playback head entered the tape centered on the guard band between two adjacent tracks, then the band appears at the extreme top edge of the screen of the video monitor and possibly again at the bottom edge of the screen.

As the tape begins to move slowly, the entry position of the head relative to the center of the track will change. That is, the head will gradually move toward the adjacent track causing the distortion band to move its position as observed on the video monitor. As tape moves in one direction very slowly, the band will appear to move from the bottom to the top of the screen, and will exit from the top of the screen and reappear at the bottom. As the tape moves in the opposite direction, the band will move from the top of the screen towards the bottom, and will exit from the bottom and re-appear at the top of the screen.

The motion of the distortion band, therefore, is in a predictable direction, and indicates a known amount of tape movement as the band progresses across the monitor screen. For example, if the band progresses from the top to the bottom of the screen, its second exit from the bottom of the screen will indicate that the tape has progressed one frame distance, or 1/16th of an inch. These progressions of the distortion band are utilized by the system of the invention to measure tape motion. The reason this can be done is because, as explained above, the scanner is running continuously, whether the tape is moving or not, so that the band is always available. If the position of the band remains static, on the screen of the monitor, it simply means that the tape is not moving. As the tape begins to move, the band will progress either toward the top of the screen and disappear, to reappear at the bottom; or it will progress towards the bottom of the screen and re-appear at the top, depending upon the direction of tape motion.

BRIEF DESCRIPTION OF THE DRAWINGS

FIG. 4 is a block diagram of a guard band detection system representing one embodiment of the invention.

DETAILED DESCRIPTION OF THE ILLUSTRATED EMBODIMENT

Figure 1:
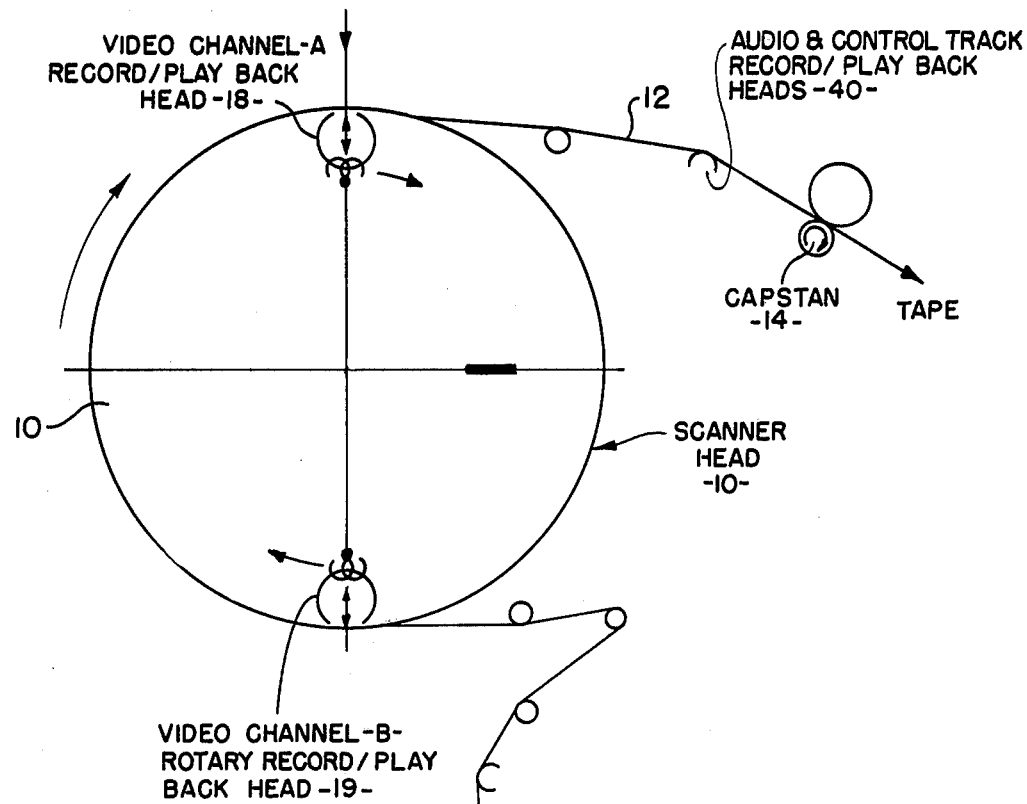
FIG. 1 is a schematic representation of the tape path of the video tape in a typical video tape recorder, as the tape is drawn around a scanner head drum, and across various additional electromagnetic heads.

The typical helical scan video tape recorder includes a scanner drum 10 around which the video tape 12 is drawn by a capstan drive 14. The drum 10 has a pair of video record/playback heads 18 and 19 mounted on it displaced 180° from one another, and these heads are caused to scan diagonally across the video tape, as the tape is drawn around the drum. The system is synchronized so that during a recording operation, head 18 records a first field of video information in a first track extending diagonally across the tape, and head 19 then records the second field of each frame of video information in an adjacent track extending diagonally across the tape, the tracks being separated from one another by a guard band. This process continues in a series of diagonal video tracks extending across the tape, as the recording process continues.

It is usual to provide two tracks of audio information on the tape, and these tracks are read by appropriate audio record/playback heads 40. As mentioned above, a control track is also provided on the video tape, in which pulses are recorded, one pulse for each successive frame of video information. These pulses are recorded and reproduced by means, for example, of a magnetic head 40.

Figure 2:
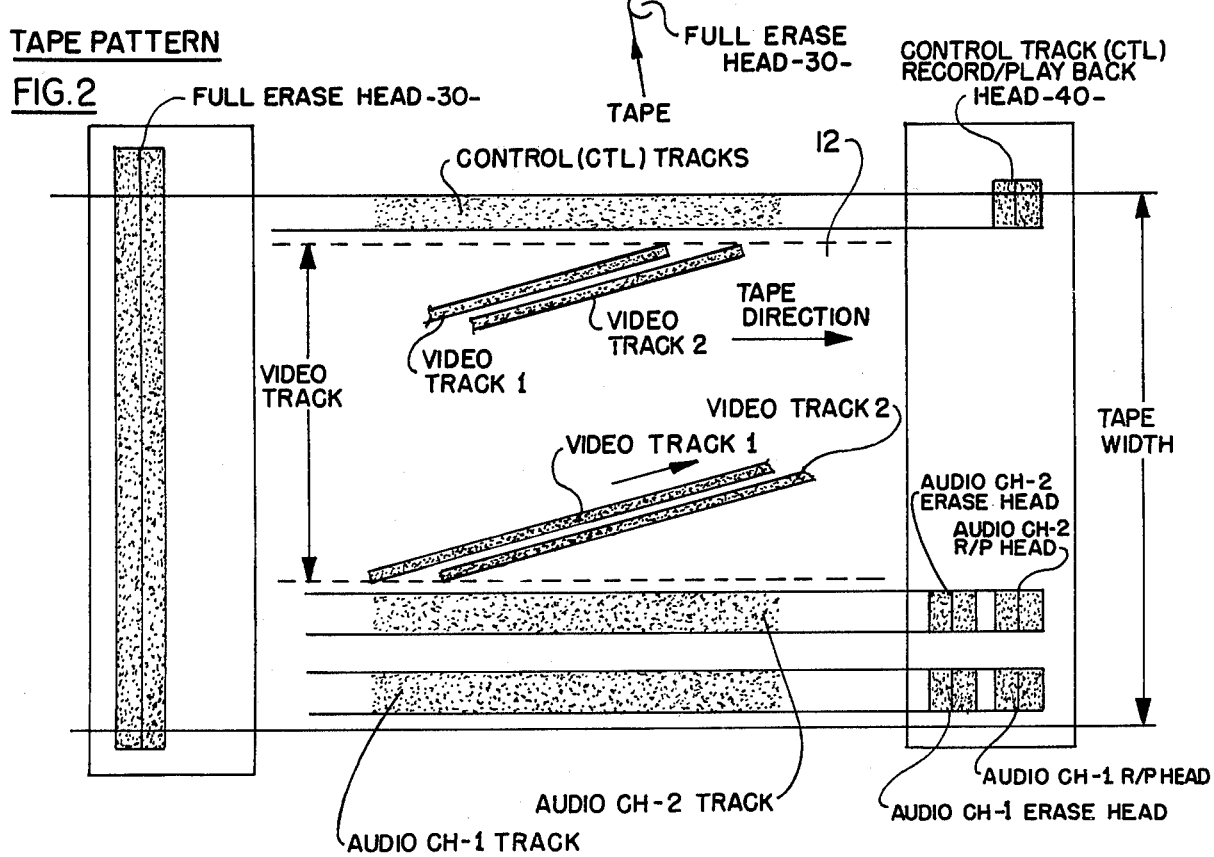
FIG. 2 is a schematic representation of a fragment of a video tape, and showing the manner in which various signals are recorded on the tape.

The diagram of FIG. 2 shows schematically the manner in which the different information is recorded on the video tape 12, and the positions of the various magnetic heads with respect to the recorded information. It will be observed from the diagram of FIG. 2 that the video information is recorded in successive video tracks extending diagonally across the tape, with a first video track and a second video track being included in each frame of video information, and with the video tracks each being separated from one another by a space known as a guard band.

Figures 3A, 3B:
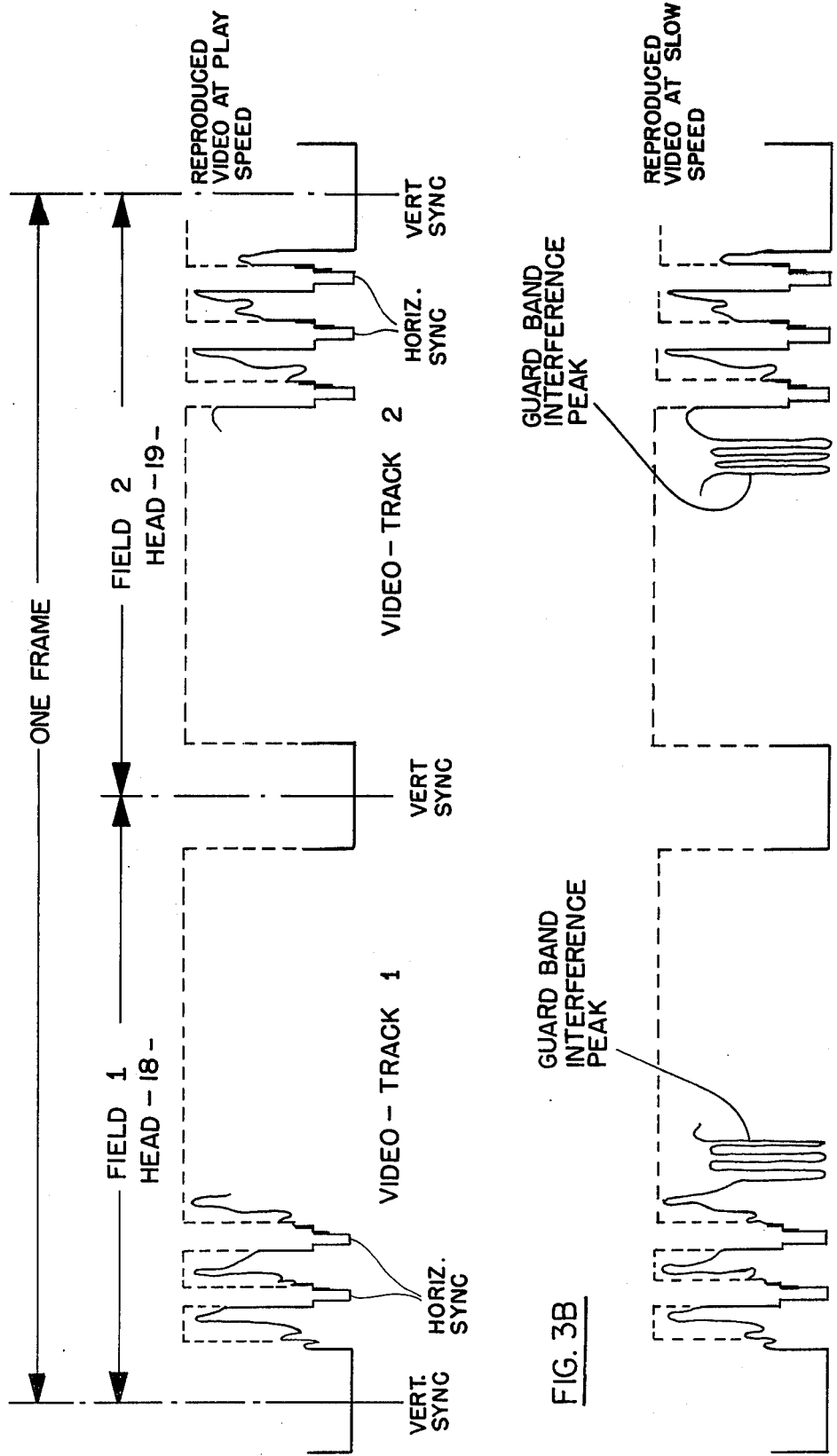
FIGS. 3A and 3B are waveforms showing the video signal derived from a typical video tape recorder, first when the video tape in the recorder is moving at normal play speed, and second when the tape in the video tape recorder is moving at a slow speed.

During normal playback operation of the video tape recorder, and when the tape is proceeding at its normal play speed, the record/playback heads 18 and 19 are scanned along the diagonal tracks of previously recorded video information in exact synchronism, so that the heads move relative to the individual tracks without being displaced on either side of the tracks. This scanning results in the production of a composite video signal such as shown in FIG. 3A by the heads 18 and 19, with each field of video information containing a preselected number of horizontal synchronizing pulses and with each field being separated by a vertical synchronizing pulse. However, when the video tape 12 is stopped, or when it is moving at a relatively slow speed, then, as the heads 18 and 19 are scanned along the tracks by drum 10, they do not maintain registry with the individual tracks, but move into the guard band between the tracks. This results in a burst of guard interference signals during each field, as shown in FIG. 3B. These bursts are read by the record/playback heads 18 and 19, and are reproduced as bursts of electrical signals of relatively high amplitude, even though the tape is stopped, or when it is moving at slow speeds, and these signal bursts are used in the system of the present invention to provide frame counting pulses, and to develop tape direction indicating signals, for slow tape speeds.

Specifically, when the tape motion is stopped and the scanner head 10 is still revolving, the record/playback heads 18, 19 now scan the video tracks at a different angle causing the heads to pass into the guard band between the two tracks, as explained above. When either one of the heads passes between the two tracks into the guard band, it actually picks up guard band noise which is caused by video signals from both adjacent tracks creating the signal bursts shown in FIG. 3B. As the video tape is slowly moved in one direction the signal bursts move with respect to the vertical synchronizing signal and, for every time a signal burst moves completely from one vertical interval to another, one field of the tape has been sensed by the head. If the tape motion changes direction, the guard band interference signal bursts move in the opposite direction with respect to the vertical interval, and appropriate circuitry is provided which responds to this action to sense tape direction. When the tape motion reaches a speed at which control track accuracy is reliable, another circuit senses that condition and causes the normal control track pulses to be used for frame counting purposes, instead of the guard band interference signals.

The detection system of the invention, in one of its embodiments, is shown in block form in FIG. 4. In the system of FIG. 4, the composite video signal read from the tape by the record/playback heads 18, 19 during a playback operation is introduced to a synchronizing signal stripper 50 and to a guard band detector 52. The output of stripper 50 is introduced to a window generator 54, and the window generator and guard band detector are both connected to a guard band locator 56.

The output of guard band locator 56 is applied to a direction finder 58 which develops a signal at output terminal 60 indicative of tape direction. The last-mentioned output is also applied to a guard band frame counter 62 which, in turn is connected to a frame count selector 64. The control track signal (30 Hz) from head 40 is applied to selector 64 through a speed sensor 66. Selector 64 selectively produces control track pulses and guard band pulses at output terminal 68 for frame counting purposes.

Figure 5:
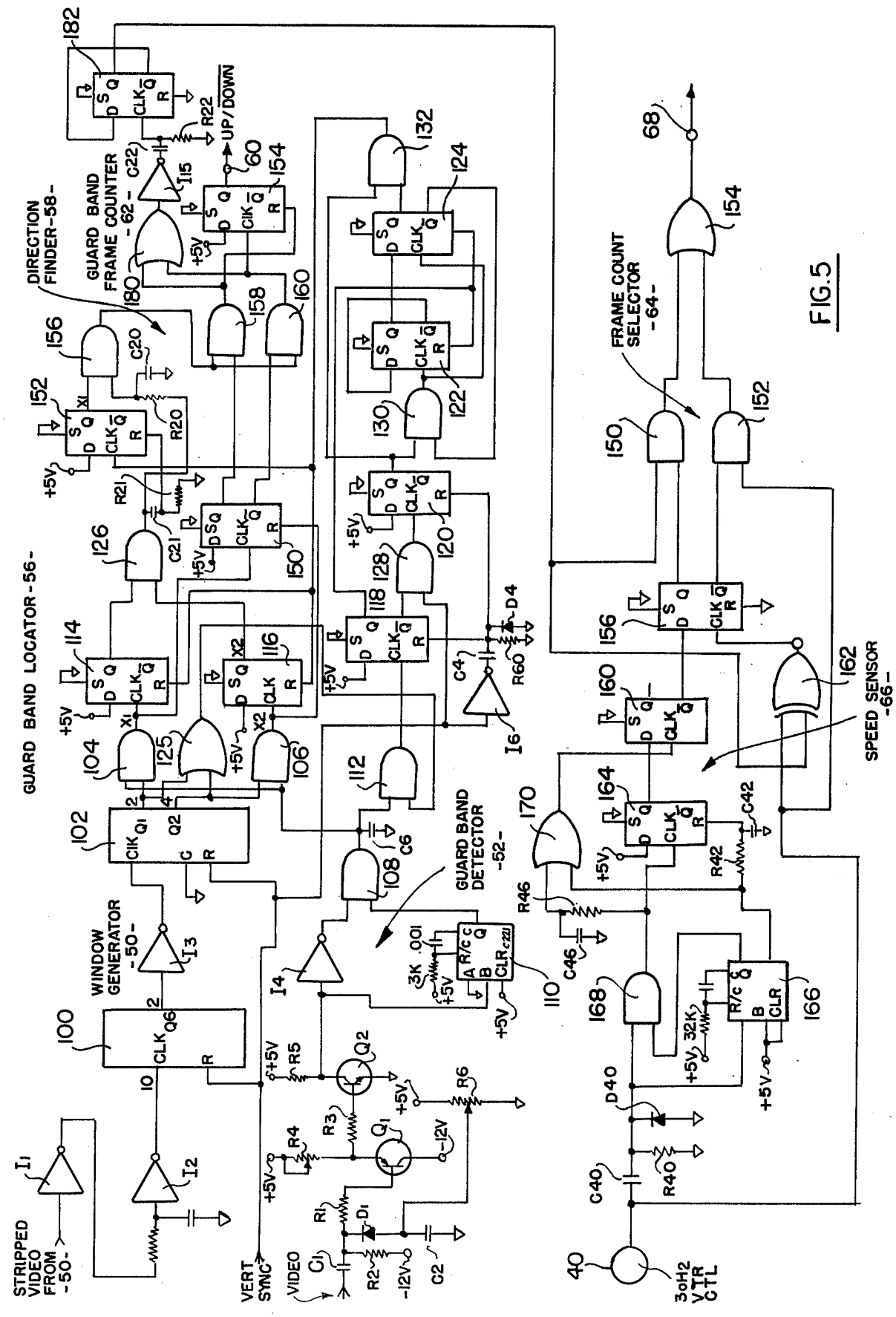
FIG. 5 is a logic diagram of the guard band detection system of FIG. 4.

As shown in the logic diagram of FIG. 5, the window generator 54 is made up of two counters 100, 102. Counter 100 is a "divide by sixty-four" binary counter, and it may be of the type designated 4040; and counter 102 is a decade counter divider and it may be of the type designated 4017. The window generator also includes three inverters I1, I2 and I3. The inverters I1 and I2 are used to filter out the high frequency guard band interference signals from the horizontal synchronizing pulses reaching counter 100. Counter 100 is used as a pre-scaler for decade counter 102. The horizontal synchronizing pulses are counted in counter 100, and the counter is reset by the vertical synchronizing pulses, so that only the horizontal synchronizing pulses between successive vertical synchronizing pulses are counted and divided by counter 100.

Counter 102 responds to the divided horizontal synchronizing pulses from counter 100 to generate two four-millisecond windows which are directly adjacent to one another, and which are approximately centered between successive vertical synchronizing pulses. There are 16 milliseconds in each field interval between successive vertical synchronizing pulses, and each such interval comprises, therefore, a 4 millisecond space, the first 4 millisecond pulse from counter 102 (designated "window 1"), the second 4 millisecond pulse from counter 102 (designated "window 2") which is directly adjacent to window 1, and then a second 4 millisecond space. Window 1 appears at output Q1 of counter 102, and window 2 appears at output Q2 of counter 102. The pulses at outputs Q1 and Q2 of counter 102 are fed respectively to "and" gates 104 and 106 in guard band locator 56.

The composite video signal from the record/playback heads 18, 19 is also fed to the guard band detector 52. The guard band detector includes a PNP transistor Q1 of the type designated 2N3906 and an NPN transistor Q2 of the type designated 2N3904. The video signal is applied to a capacitor C1 of a value of 47 microfarads, the capacitor being connected to the base of the transistor Q1 through a 40 ohm resistor R1. The junction of capacitor C1 and resistor R1 is connected to a negative 12-volt source through a 560 ohm resistor R2. The junction is also connected through a diode D1 to a grounded 10 microfarad capacitor C2. The collector of transistor Q1 is directly connected to the negative 12-volt source, and its emitter is connected through a 10 kilo-ohm resistor R3 to the base of transistor Q2 and through a variable 5 kilo-ohm resistor R4 to a positive 5-volt source.

The emitter of transistor Q2 is grounded, and the collector is connected to an inverter I4, which may be of the type designated 4069, and through a 10 kilo-ohm resistor R5 to the positive 5-volt source. Inverter I4 is connected to one input of an "and" gate 108. The collector of the transistor is also connected to a one-shot 110 which may be of the type designated C121 whose Q output is also introduced to "and" gate 108. The output of "and" gate 108 is introduced to one input of an "and" gate 112 in the guard band locator 56. The output of "and" gate 108 is also applied to the "and" gates 104 and 106 in the guard band locator. The output terminal of the "and" gate 108 is connected to a grounded 18 microfarad capacitor C6. The junction of diode D1 and capacitor C2 is connected to a 500 ohm potentiometer R6. This circuit serves as a DC level shifting circuit for the incoming video, the DC level being adjustable by the potentiometer R6.

Transistor Q1 is connected as an emitter follower, and it is biased so that only the tips of the horizontal synchronizing pulses and of the guard band interference signals are applied to the base of transistor Q2. The output from transistor Q2 is applied to one-shot 110 which derives a 3 microsecond pulse from the leading edge of each horizontal synchronizing pulse. The output pulses from transistor Q2 are inverted by inverter I4, and the inverted pulses from the inverter, along with the output pulses from one-shot 110 are applied to "and" gate 108. Each time a guard band signal burst is passed through inverter I4, the "and" gate 108 will see a difference as compared with a horizontal synchronizing pulse tip, and its output will indicate the presence of a guard band signal burst.

The function of the guard band detector 52 is to determine when either one of the record/playback heads 18, 19 is passing over a guard band area, which only occurs during a playback operation when the video tape is moving at other than the normal play speed. As described above, the effect when the guard band area is crossed by a head is one of distorting the composite video and synchronizing signal. This occurs because the head begins simultaneously to pick up information from the two tracks on either side of the guard band. These two tracks represent two separate but adjacent video signal recordings, so that when the two signals are read together by one head a distortion results. The result is an amplitude and phase distortion which causes the horizontal synchronizing pulses to be correspondingly distorted. Specifically, the edges of the horizontal synchronizing pulses become ragged, and the excursions of the horizontal synchronizing pulses are no longer fast and sharp. The guard band detector circuit 52 detects all the horizontal synchronizing pulses whose waveforms have become degraded in this manner. The guard band detector circuit 52 accomplishes this by looking at the horizontal synchronizing pulse peaks and providing an output each time a horizontal synchronizing pulse peak is distorted. As described above, this output will occur normally once during each vertical field interval during slow tape speeds, and will remain stationary when the tape is stopped, but will move in one direction or the other in the corresponding field interval when the tape is moving, and depending upon the direction of tape movement.

The guard band locator 56, in addition to the "and" gates 104, 106 and 112 referred to above, also includes a number of flip-flops designated 114, 116, 118, 120, 122, 124; an "or" gate 125; and additional "and" gates 126, 128, 130 and 132. The guard band locator also includes an inverter I6 which inverts the vertical synchronizing signals, and which introduces the inverted vertical synchronizing pulses to the reset terminals of flip-flops 118 and 120 through a circuit including a 0.001 microfarad capacitor C4, a grounded 20 kilo-ohm resistor R60, and a grounded diode D4.

The main function of the guard band locator 52 is to locate the position of the guard band disturbance pulse from detector 52 within each field interval. The direction finder 58 detect the direction of movement, if any, of the guard band pulse from one field to another. This is achieved by determining whether the guard band pulse is in either of the windows 1 or 2 generated by the window generator 54; whether it has just left either of the windows; or whether it has crossed from one of the windows to the other.

To achieve the foregoing, the guard band pulse from the "and" gate 108 is applied to the three "and" gates 104, 106 and 112. In this way, the flip-flop 114 is clocked during the window 1 output at terminal Q1 of counter 102; the flip-flop 116 is clocked during the window 2 output at output terminal Q2 of the counter; and the flip-flop 118 is clocked by a guard band pulse when either of the window outputs appear at terminals Q1 and Q2 of the counter. Flip-flop 118 is reset on the trailing edge of every vertical synchronizing pulse, so that it is reset at the beginning of each field interval. If the guard band pulse occurs in either of the windows during any particular field interval, then the Q output of flip-flop 118 will go high, and the $\overline{Q}$ output will go low. Otherwise, the Q output will stay low, and the $\overline{Q}$ output will stay high, indicating that the guard band pulse is not in either of the windows.

Flip-flop 120 is clocked on by the leading edge of each vertical synchronizing pulse when flip-flop 118 is off, that is, when the guard band pulse is not in either of the windows. Flip-flop 120 is reset on the trailing edge of each vertical synchronizing pulse. Therefore, flip-flop 120 generates pulses at its Q output terminal corresponding to successive vertical synchronizing pulses, so long as the guard band pulse is not in either window. If the guard band pulse is in either window, flip-flop 120 remains off.

Flip-flops 122 and 124 are connected as a counter, so that two successive pulse are required from flip-flop 120 before the Q output of flip-flop 124 will be set true, indicating that the guard band pulse is in neither window. Therefore, if there is in fact a guard band pulse in one of the windows, but that pulse was missed at the first scan, there still will be no determination made unless two successive scans show that there is no guard band pulse in either window. When that occurs, the output of "and" gate 132 (designated "neither") goes high to indicate that the guard band pulse is not in either window. The output from the "and" gate 132 is used to reset flip-flops 114 and 116.

It will be remembered that the flip-flop 114 will be set if the guard band pulse is in window 1, and the flip-flop 116 will be set if the guard band pulse is in window 2. If the guard band pulse crosses the boundary between the two windows, both flip-flops will be set and, in that event, gate 126 will generate an output.

Direction finder 58 includes three flip-flops 150, 152 and 154, and three "and" gates 156, 158 and 160. The output of "and" gate 126 of the guard band locator 56 is connected through a 50 kilo-ohm resistor R20 to one input of "and" gate 156, and to a grounded 0.1 microfarad capacitor C20. The output of the "and" gate is also connected to a 0.001 microfarad capacitor C21 which, in turn, is connected to the reset terminal of flip-flop 152 and to a grounded resistor R21. Therefore, "and" gate 156 is enabled when the guard band also crosses the boundary between the two windows and is, accordingly, simultaneously in both windows. Also, the output of "and" gate 104 sets flip-flop 150, and that occurs when the guard band pulse is in window 1; whereas the output of gate 106 resets flip-flop 150, and that occurs when the guard band burst is in the second window.

Therefore, flip-flop 150 is constantly being addressed by the guard band pulse when it is in window 1, and reset by the guard band pulse when it is in window 2. As the guard band pulse enters window 1, it will set the flip-flop 150, and as the guard band pulse enters window 2, it will reset the flip-flop 150. The flip-flop 152, on the other hand, is set when the guard band pulse is in neither window. Therefore, should the guard band pulse move to window 1, flip-flop 150 will be set, if it then moves to window 2, flip-flop 150 will be reset, and if it then leaves window 2, flip-flop 152 will be set.

When flip-flop 150 is set, its Q output goes high and "and" gate 156 is enabled. When the guard band pulse crosses the boundary between the two windows, the output of "and" gate 156 goes high enabling the "and" gates 158 and 160. Now, the output of flip-flop 150 will determine whether flip-flop 154 will be set or reset through the enabled "and" gates 158 and 160 to indicate the direction of tape movement. As described, flip-flop 150 is set if the guard band pulse was last in window 2, and under such conditions "and" gate 158 will reset flip-flop 154 indicating that the tape is moving in the reverse direction. On the other hand, if the guard band pulse was last in window 1, flip-flop 150 is reset, and "and" gate 160 will set flip-flop 154, indicating that the tape is moving in the forward direction. Flip-flop 154, therefore, develops an output designated up/$\overline{down}$ which is low if the tape is moving in the reverse direction, and which is high when the tape is moving in the forward direction.

The outputs of the "and" gates 158 and 160 are introduced to an "or" gate 180 in the guard band frame counter 62. The output of the "or" gate is introduced to an inverter 115, the output of which is coupled through a capacitor C22 to the clock input of a flip-flop 182. The clock input of the flip-flop is also connected to a 20 kilo-ohm resistor R22. Therefore, each time a guard band progresses from window 1 or window 2 to neither, a pulse is introduced to the guard band frame counter 62. The counter is a divide-by-two counter so that a flip-flop 182 provides an output for every second field, so that frame counting output pulses are obtained which are introduced to the frame count selector 64. The purpose of the frame count selector 64 is automatically to select the frame count pulses from the guard band frame counter 62 when the speed of the tape is below a particular minimum, and then to select automatically the normal control track frame count pulses when the speed of the tape is above a particular speed.

The output of the guard frame counter 62 is introduced to an "and" gate 150 in the frame count selector 64, and the normal control track pulses from the control track head 40 are introduced to an "and" gate 152. These "and" gates are connected to the output terminal 68 through an "or" gate 154. A flip-flop 156 in the frame count selector 64 determines which of the frame count pulses are to be introduced to the output terminal 68. This flip-flop 156 is controlled by flip-flop 160 in the speed sensor circuit 66, and by an exclusive "nor" gate 162 which is connected as a comparator. The $\overline{Q}$ output of flip-flop 160 is connected to the D input of flip-flop 156, and the exclusive "nor" gate 162 is connected to the clock input of the flip-flop. The control track scanning head 40 is connected to the exclusive "nor" gate 162, as is the output of the guard frame counter 62.

The speed sensor 66 also includes a flip-flop 164, a one-shot 166, an "and" gate 168, and an "or" gate 170. The control track scanning head 40 is coupled to "and" gate 168 through a 0.001 microfarad capacitor C40, the capacitor being connected to a grounded 20 kilo-ohm resistor R40 and to a grounded diode D40. The capacitor C40 is also connected to the one-shot, and the Q output of the one-shot is connected to the "and" gate 168. The $\overline{Q}$ output of the one-shot 166 is connected to "or" gate 170, whose output is introduced to the clock input of flip-flop 160. The $\overline{Q}$ of one-shot 166 is also connected to the reset terminal of flip-flop 164 through a 20 kilo-ohm resistor R42, the resistor being connected to a grounded 0.001 microfarad capacitor C42. The output of "and" gate 168 is connected to "or" gate 170 through a 4.7 kilo-ohm resistor R46, which is connected to a grounded 0.001 microfarad capacitor C46.

The positive edge of the control track pulse derived from scanning head 40 triggers one-shot 166, which may be of the type designated 4528, and which has a time-out of 320 milliseconds which is representative of the control track pulse at one-tenth play speed. If another control track pulse occurs before the time-out of the one-shot, it is clocked through "and" gate 168 and sets flip-flop 164, thereby indicating that the tape is travelling at greater than one-tenth speed. However, if the one-shot 166 times out before the occurrence of a succeeding control track pulse, flip-flop 164 is reset. So long as flip-flop 164 is set, flip-flop 160 remains reset. However, when flip-flop 164 is reset, indicating a tape speed of less than one-tenth, flip-flop 160 is set. Therefore, flip-flop 160 is set when the tape is travelling at less than one-tenth speed, and flip-flop 160 is reset when the tape is travelling at greater than one-tenth speed.

The state of flip-flop 160 controls the flip-flop 156 in the frame selector. When flip-flop 160 is set, indicating that the tape is travelling at greater than one-tenth speed, flip-flop 156 is reset, so that the pulses from the control track on the tape are passed through "and" gate 152 and "or" gate 154 to the output terminal 68. However, when the tape is travelling at less than one-tenth speed, flip-flop 22 is reset, permitting flip-flop 156 to be set, so that the frame count pulses may be selected from the guard band frame counter 62. The comparator 162 causes the flip-flop 156 to be set only when the control track pulse from the head 40 and the guard band frame counter pulse from the frame counter 62 are in phase so as to assure that there will not be an extra spurious pulse output at output terminal 68 during the switch-over operation.

The invention provides, therefore, a detection system for a helical scan video tape recorder which makes use of the guard band interference pulse signals at low tape speeds for generating frame count signals which are used to count tape frames at low speed, and also to designate the direction of movement of the tape at the low speeds.

It will be appreciated that while a particular embodiment of the invention has been shown and described, modifications may be made. The following claims are intended to cover all modifications which come within the spirit and scope of the invention.

What is claimed is:

1. A detection system for use with a helical scan video tape recorder which includes a video tape on which a composite video signal having vertical and horizontal synchronizing pulses is recorded in successive fields in a series of diagonal tracks separated from one another by a corresponding series of guard bands, with two such fields representing a frame of video information, said system serving to detect guard band interference signals and for generating control pulses in response thereto which indicate the frames of video information on the video tape at low tape speeds, said video tape recorder including magnetic head means for reading the composite video signal recorded in said diagonal tracks, and said detector system including: synchronizing signal stripper circuit means coupled to said magnetic head means for removing the vertical and horizontal synchronizing signals from the composite video signals; generator circuit means coupled to said synchronizing stripper circuit means for generating at least one control pulse during each field of said composite video signal and at a predetermined location in said field; a guard band detector circuit means coupled to said magnetic head means and responsive to the horizontal synchronizing signals of said composite video signal for detecting a guard band interference signal during each field of said composite video signal when the tape speed falls below a particular level; guard band locator circuit means coupled to said generator circuit means and to said guard band detector circuit means for producing output signals establishing the location of said guard band interference signal with respect to said control pulse generated by said generator circuit means during each of said fields; output circuitry coupled to said guard band locator circuit for producing an output pulse each time a frame of video signal on the video tape is sensed by said electromagnetic head means, the video tape including a control track having pulses recorded thereon indicative of the frames of video signal recorded on the tape, the video tape recorder including a further magnetic head means for reading the pulses recorded on the control track, and said output circuitry including a selector circuit coupled to said further magnetic head means; and a speed sensor circuit coupled to said further magnetic head means and to said selector circuit for causing said selector circuit normally to select pulses generated by said further magnetic head means, and to cause said selector circuit to select pulses from said guard band locater circuit means when the tape speed falls below said particular level.

2. The combination defined in claim 1, and which includes direction indicating circuitry connected to said guard band locator circuit means and responsive to the output signals therefrom for producing an output signal indicative of the direction of movement of the tape.

3. The combination defined in claim 1, in which said generator circuitry generates two control pulses directly adjacent to one another during each of the fields, and in which said guard band location circuitry establishes the location of the guard band interference signal with respect to said two control pulses generated by said generating circuitry during each of the fields.

4. The combination defined in claim 3, and which includes direction indicating circuitry coupled to said guard band locator circuitry and responsive to the output signals therefrom for producing an output signal indicative of the direction of movement of the tape.

* * * * *